United States Patent [19]

Zebli

[11] 4,187,821
[45] Feb. 12, 1980

[54] INTERNAL COMBUSTION ENGINE WITH A BYPASS LINE SKIRTING THE LOAD-CONTROL ORGAN OF THE INTERNAL COMBUSTION ENGINE

[75] Inventor: Roland-Detlev Zebli, Stuttgart, Fed. Rep. of Germany

[73] Assignee: Dr. Ing. h.c. F. Porsche Aktiengesellschaft, Fed. Rep. of Germany

[21] Appl. No.: 874,937

[22] Filed: Feb. 3, 1978

[30] Foreign Application Priority Data

Feb. 3, 1977 [DE] Fed. Rep. of Germany ....... 2704456

[51] Int. Cl.² ...................... F02N 17/00; F02M 7/00; F02M 1/10
[52] U.S. Cl. ............................ 123/179 G; 123/124 A; 123/119 D; 261/39 D; 123/140 MP
[58] Field of Search .......... 123/124 A, 179 G, 179 L, 123/119 D, 179 A, 140 MP; 261/39 D

[56] References Cited

U.S. PATENT DOCUMENTS

| | | | |
|---|---|---|---|
| 2,893,367 | 7/1959 | Druzynski | 123/140 MP |
| 3,670,709 | 6/1972 | Eckert et al. | 123/124 A |
| 3,866,588 | 2/1975 | Nakada et al. | 123/124 A |
| 3,927,649 | 12/1975 | Stumpp | 123/140 MC |
| 4,064,854 | 12/1977 | Fehrenbach et al. | 123/179 G |
| 4,084,565 | 4/1978 | Dorsch | 123/140 MP |
| 4,125,100 | 11/1978 | Assenheimer et al. | 123/119 D |

*Primary Examiner*—Charles J. Myhre
*Assistant Examiner*—M. Moy
*Attorney, Agent, or Firm*—Craig and Antonelli

[57] ABSTRACT

An improvement in internal combustion engines of the type having an air supply line for supplying air to a combustion chamber and an auxiliary air valve containing a valve member connected to and movable with a membrane which is displaceable under action of the suction pressure in the air supply line includes, in a further embodiment, a valve line interconnecting the air supply line and one side of the membrane, a condition-responsive valve located in the valve line which is shiftable from a first position communicating one side of the membrane of the auxiliary air valve with the atmosphere and a second position communicating the one side of the membrane with the air supply line, and wherein the condition-responsive valve is shifted between the first and second positions for opening the auxiliary air valve during starting of the engine and for closing the auxiliary air valve during the warm operating phase of the engine.

3 Claims, 2 Drawing Figures

INTERNAL COMBUSTION ENGINE WITH A BYPASS LINE SKIRTING THE LOAD-CONTROL ORGAN OF THE INTERNAL COMBUSTION ENGINE

BACKGROUND OF THE INVENTION

The invention relates to an internal combustion engine having a bypass line skirting the load-control organ of the internal combustion engine in which a regulating device is arranged, controlling the bypass line, which is constructed by an auxiliary air valve controlled through a control line in dependence of the suction pipe vacuum and that the internal combustion engine is provided with, for example, an air-measuring, drive-less injection installation with continuous fuel supply and partially exhaust burning unit according to commonly assigned U.S. patent application Ser. No. 719,706, filed Sept. 2, 1976, now U.S. Pat No. 4,084,565 which is incorporated by reference to the extent necessary for a full understanding of the present invention.

Internal combustion engines with injection installations of the mentioned kind (Bosh, Technische Unterrichtung Benzineinspritzung K-Jetronic, 1st Issue, February 1974) in which, during the warm-operation phase of the internal combustion engine, a larger quantity of fuel-air mixture must be supplied to the internal combustion engine than corresponds to that achieved as a result of the position of the load-regulating device in order to compensate for the friction load occurring in this phase of operation. This is accomplished by the auxiliary air slide bypassing the load-regulating device. The cross section of the slide is regulated by an apertured partition controlled in dependence of the heating of an electrically heated bimetal strip which is closed when a warm operating condition of the internal combustion engine is achieved. Nevertheless, it has been proven disadvantageous that the additional quantity of fuel-air mixture, which is adequate during the warm-operation phase after the starting process has not always been found sufficiently large during the starting process whereby, among other things, a sure start and a quick high operating speed of the internal combustion engine to idling speed is not assured.

To avoid this disadvantage, it is known from the above-noted Ser. No. 719,706 that the regulating organ controlling the bypass line is constructed by means of an auxiliary air valve controlled in dependence of the suction pipe vacuum. In one exemplified embodiment, the auxiliary air valve is provided with a valve plate connected to a membrane which opens and closes the bypass line whereby, through the bypass line, the suction pipe vacuum acts at one side of the membrane ahead of the load-regulating organ and, through a control or regulating line, the suction pipe vacuum acts at the other side of the membrane behind the load-regulating organ, and that at the side of the membrane admitted by the suction pipe vacuum, a compression spring is provided. By this means, a sure start of the internal combustion engine and a quick increase to a high rotative speed is assured; however, as a result of the increasing suction pipe vacuum, the bypass line is closed by the auxiliary air valve before the exhaust after-burning arrangement reaches the temperature sufficient for the exhaust after-burning.

It is therefore an object of the present invention to decrease the time which is necessary until the temperature of the exhaust after-burning device required for the exhaust after-burning is reached.

According to a preferred embodiment, this problem is solved in that a thermo-switching valve is arranged in the control line regulating the opening cross section of the control line.

By means of the thermo-switching valve, the bypass line is held open also with increasing suction pipe vacuum for a predetermined time by the regulating organ, so that throughout this time, a larger quantity of fuel-air mixture is supplied to the internal combustion engine than corresponds to that achieved as a result of the position of the load-regulating organ. This operating phase of the internal combustion engine with increased rotational speed after a cold start effects a higher exhaust temperature which leads to a quick attainment of the temperature of the exhaust after-burning installation necessary for the exhaust after-burning.

These and further objects, features and advantages of the present invention will become more obvious from the following description when taken in connection with the accompanying drawings which show, for purposes of illustration only, a single embodiment in accordance with the present invention.

DESCRIPTION OF THE PREFERRED EMBODIMENTS

Figure 1:
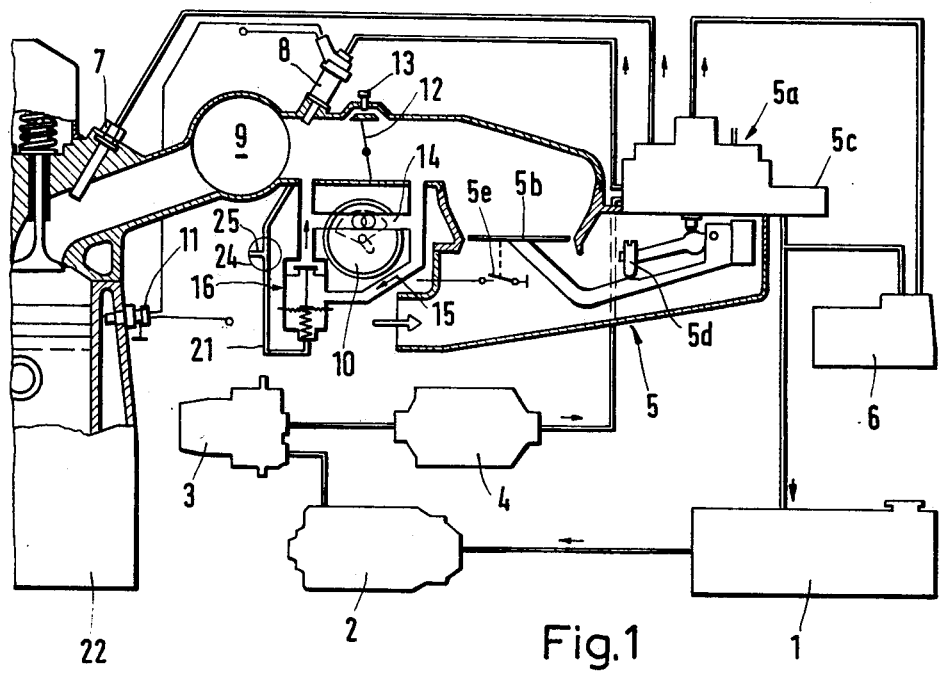
FIG. 1 shows an auxiliary air valve as part of an air-measuring, drive-less injection mechanism with continuous fuel supply and an air-addition slide.
Figure 2:
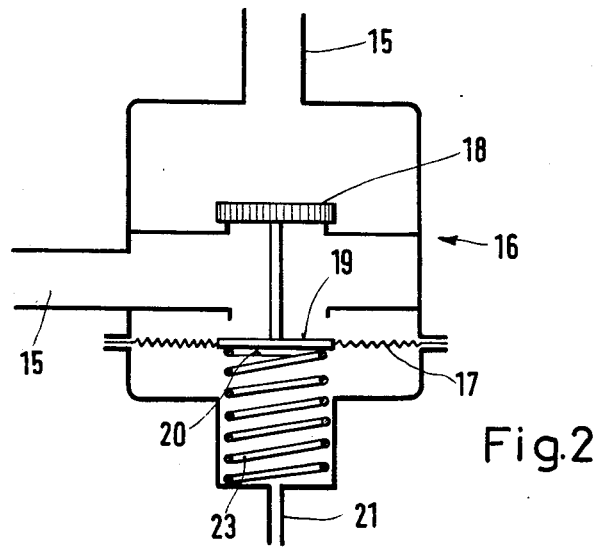
FIG. 2 shows an auxiliary air valve according to FIG. 1.

In the injection mechanism illustrated in the drawings, the fuel tank from which fuel is supplied to a mixture regulator 5 through an electro-fuel pump 2, a fuel reservoir 3 and a fuel filter 4 is designated as 1. The mixture regulator 5 is provided with a fuel quantity divider 5a, an air quantity measuring device 5b, a system pressure regulator 5c, a mixture regulating screw 5d and an air quantity measuring contact 5e. Item 6 is a warm-operation regulator, 7 represents an injection valve, 8 is an electro-starting valve, 9 is a collecting suction pipe, 10 represents an air-addition slide, 11 is a thermo-time switch, 12 is a load-regulating organ, for example, a throttle-flap, and 13 represents a no-load adjusting screw.

The air-addition slide 10 is arranged at a bypass line 14 passing by the load regulating organ 12. A bypass line 15 passing by the load-regulating organ 12 and the air-addition slide 10 in which an auxiliary air valve 16 is arranged. The auxiliary air valve 16 is provided with a valve plate 18 connected to a membrane 17 which opens or closes the bypass line 15. The suction pipe pressure acts at the slide 19 of membrane 17 through the portion of bypass line 15 which is upstream of the load-regulating organ 12, while the suction pipe vacuum acts on side 20 through a control line 21 connected downstream of the load-regulating organ 12. In the control line 21, a thermo-switch valve 24 of a construction known per se is arranged for regulating the opening cross section of the control line 21. The thermo-switch valve 24 is provided with a vent pipe 25 for venting the control line. An internal combustion engine is designated as 22. A compression spring 23 is arranged at the side 20 of the membrane 17 and, inasmuch as a detailed discussion of such an auxiliary air valve, as well as modifications thereof, are fully described in Ser. No. 719,706, which has been incorporated by reference, no further description is believed necessary.

The mode of operation of the invention is as follows:

The illustrated injection system is a mechanical, continuously operating injection system for Otto-engines which does not require a drive from the internal combustion engine. The fuel is supplied by an electrically driven roller-cell pump 2. The air quantity drawn in by the internal combustion engine 22 during operation is measured by an air quantity measuring device 5b which is installed upstream of the load-regulating organ 12 of the internal combustion engine. According to the position of the load-regulating organ 12, responsive to the position of the gas pedal, more or less is sucked in. According to the air quantity measured, the fuel quantity divider 5a divides the supply to the individual cylinders of the internal combustion engine 22 through the respective injection valves 7 and, as a result, a fuel quantity which achieves an optimal mixture regarding internal combustion engine output, fuel consumption and exhaust composition is provided. The air quantity measuring device 5b and the fuel quantity divider 5a are combined in one aggregate, the mixture regulator 5. The accurately measured fuel quantity is supplied to the injection valves 7 which spray the fuel in vaporized form continually into the suction pipe ahead of the inlet valves of the cylinders of the internal combustion engine 22. From there, the fuel is sucked into the cylinders of the internal combustion engine 22 together with the air during opening of the inlet valves. If necessary, a correction unit among others for the warm-operating phase of the internal combustion engine is available to the injection system.

During the warm-operating phase of an internal combustion engine, essentially two corrections in contrast to the operating-warm condition are necessary:

1. Equalization of the condensation losses at the cold combustion chamber and at the suction pipe walls.

2. Equalization of the increased friction work.

The condensation losses are equalized by a richer mixture. This task is accomplished by the warm-operation regulator 6.

The increased friction work is equalized by the supply of a larger quantity of the fuel-air mixture than corresponds to that achieved as a result of the position of the load-regulating organ 12. This is obtained by bypassing of the load-regulating organ 12 by means of an air-addition slide 10. The cross section thereof is controlled by an aperture partition that is dependent upon the heating up of an electrically heated bimetal strip. In the operationally warm condition, the cross section of the air addition slide is closed.

During the starting process of the internal combustion engine 22 with the engine being cold with respect to the surroundings, the control line 21 is closed against the suction pipe vacuum by means of a thermo-switching valve 24 and the portion of the control line 21 facing the auxiliary air valve 16, is vented through the vent line 25; that is, it is connected to the atmosphere. On the basis that in this portion of the control line 21, no vacuum exists, the bypass line 15 is opened by the force of the compression spring 23 acting via the membrane 17 onto the valve plate 18 so that air is supplied to the internal combustion engine 22 via the load-regulating organ 12, the air-addition slide 10 and auxiliary air valve 16. During this operating phase, the internal combustion engine 22 runs at a higher rotative speed whereby the exhaust temperature is increased and the temperature, necessary for the after-burning of the exhaust in a not shown exhaust after-burning system is attained quicker. After reaching a predetermined temperature in the area of the internal combustion engine 22, the thermo-switching valve 24 opens the control line 21 against the suction pipe vacuum so that the available suction pipe vacuum downstream of the load-regulating organ 12 effects a closing of the bypass line 15 by the valve plate 18 and air is only supplied to the internal combustion engine 22 through the load-regulating organ 12 and the air-addition slide 10.

The invention is not limited to the shown exemplified embodiment since the inventive air-addition valve-control may also be utilized with internal combustion engines having other fuel-air mixtures—supply arrangements such as, for example, mechanical injection pumps with suction-pipe injection or electronic injection systems. Over and above, the construction of the auxiliary valve is not essential for the invention. For example, an auxiliary valve as is shown in FIG. 3 of the above-noted U.S. Ser. No. 719,706 may also be utilized. For this, only an additional control line would be necessary which would connect the opening, leading to the atmosphere, to the suction pipe vacuum of the internal combustion engine and in which the thermo-switching valve is arranged. On the basis of the structural arrangement of this air-addition valve, the bypass line, after reaching a predetermined temperature, is closed by venting the control line through the thermo-switching valve. Also, a time switch could be used in place of the thermo-switching valve which would timely influence the control line after starting of the internal combustion engine.

While I have shown and described one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. In an internal combustion engine of the type having an air supply line for supplying air to a combustion chamber, a load-regulating member disposed in said supply line, a bypass line extending in bypassing relationship to said load-regulating member from a position upstream of said load-regulating member to a position downstream thereof, and an auxiliary air valve disposed in said bypass line, said auxiliary air valve having a valving member connected to and movable with a membrane which is displaceable under action of the suction pressure in said air supply line to control air flow through said bypass line, the improvement comprising:

a valve line interconnecting said air supply line and one side of said membrane, a condition responsive valve means located in said valve line, said condition responsive valve means being shiftable from a first position communicating said one side of the membrane with the atmosphere to retain said valving member in a position opening said bypass line and a second position communicating said one side of the membrane with said air supply line to obtain said displacement under action of the suction pressure in said air supply line and means for shifting said condition responsive valve means between said first and second positions for opening said auxiliary air valve during a warm operating phase of the engine.

2. In an internal combustion engine according to claim 1, wherein the means for shifting the condition responsive valve means acts in response to the engine reaching a predetermined temperature.

3. In an internal combustion engine of the type having an air supply line for supplying air to a combustion chamber, a load-regulating member disposed in said supply line, a bypass line extending in bypassing relationship to said load-regulating member from a position upstream of said load-regulating member to a position downstream thereof, and an auxiliary air valve disposed in said bypass line, said auxiliary air valve having a valving member connected to and movable with a membrane which is displaceable under action of the suction pressure in said air supply line, the improvement comprising:

a valve line interconnecting said air supply line and one side of said membrane, a condition responsive valve means located in said valve line, sid condition responsive valve means being shiftable from a first position communicating said one side of the membrane with the atmosphere and a second position communicating said one side of the membrane with said air supply line, and means for shifting said condition responsive valve means between said first and second positions for opening said auxiliary air valve during starting of the engine and for closing the auxiliary air valve during a warm operating phase of the engine, wherein the means for shifting the condition responsive valve means acts in response to a predetermined time delay after starting of said engine.

* * * * *